(12) United States Patent
Chen

(10) Patent No.: US 6,544,454 B1
(45) Date of Patent: Apr. 8, 2003

(54) MANUFACTURING PROCESS FOR A CONSTRUCTION STRIP WITH COLORFUL PROTECTIVE COATING SHELL

(76) Inventor: Wei Chen, 918 Sol Vista Way, Walnut, CA (US) 91789

( * ) Notice: Subject to any disclaimer, the term of this patent is extended or adjusted under 35 U.S.C. 154(b) by 163 days.

(21) Appl. No.: 09/625,303

(22) Filed: Nov. 21, 2000

Related U.S. Application Data

(63) Continuation of application No. 09/031,433, filed on Feb. 26, 1998, now abandoned.

(51) Int. Cl.[7] .............................................. B29C 47/06
(52) U.S. Cl. ............................. 264/171.13; 264/211.11; 264/171.25
(58) Field of Search ....................... 264/171.13, 171.25, 264/129, 211.11; 156/244.12; 427/372.2

(56) References Cited

U.S. PATENT DOCUMENTS

| | | | | |
|---|---|---|---|---|
| 3,816,362 A | * | 6/1974 | Tsuchihara et al. ............ | 524/44 |
| 3,852,083 A | * | 12/1974 | Yang ........................... | 106/701 |
| 3,857,806 A | * | 12/1974 | Isaacs et al. ................ | 524/819 |
| 4,450,200 A | * | 5/1984 | Iwato et al. ................ | 428/323 |
| 4,902,733 A | * | 2/1990 | Angerer ....................... | 524/42 |
| 5,661,216 A | * | 8/1997 | Laginess et al. ............ | 524/237 |
| 5,814,374 A | * | 9/1998 | Nkansah et al. ......... | 427/385.5 |
| 5,951,805 A | * | 9/1999 | Nonis et al. ........... | 156/244.12 |
| 5,998,529 A | * | 12/1999 | Chen ........................... | 524/425 |
| 6,303,061 B1 | * | 10/2001 | Hewins ....................... | 264/119 |
| 6,357,197 B1 | * | 3/2002 | Serino et al. .......... | 156/244.12 |

* cited by examiner

Primary Examiner—Jan H. Silbaugh
Assistant Examiner—Geoffrey P. Shipsides
(74) Attorney, Agent, or Firm—Raymond Y. Chan; David and Raymond Patent Group

(57) ABSTRACT

A manufacturing process of a construction strip includes the steps of (a) evenly mixing a predetermined amount of paint, talcum powder and volatile agent to form a plaster form coating mixture; (b) gradually passing an elongated strip body through an extrusion passage of an extrusion mold, wherein a uniform surrounding clearance between an interior wall of said extrusion passage and said strip body; (c) continuously injecting said coating mixture into said extrusion passage of said extrusion mold in order to fill said surrounding clearance, so that a uniform protective coating is evenly coated on said longitudinal surfaces of said strip body while said strip body is extruded from said extrusion mold; and (d) drying said protective coating to form a hard and durable protective coating shell integrally wrapped around said strip body.

4 Claims, 5 Drawing Sheets

MANUFACTURING PROCESS FOR A CONSTRUCTION STRIP WITH COLORFUL PROTECTIVE COATING SHELL

CROSS REFERENCE OF RELATED APPLICATION

This is a continuation application of a non-provisional application, application Ser. No. 09/031,433, filed on Feb. 26, 1998 now abandoned.

FIELD OF THE PRESENT INVENTION

The present invention relates to construction strip, and more particularly to a construction strip with colorful protective coating shell and the manufacturing process thereof, wherein the colorful protective coating shell is integrally coated around a strip body and forms a colorful exterior protection layer that is durable and resists scratching.

BACKGROUND OF THE PRESENT INVENTION

Various kinds of construction strip, such as ceiling molding, skirting board, door frame, window frame, and furniture molding, are commonly used in interior construction and decoration. A conventional construction strip, no matter it is used as a ceiling molding, a skirting board, a door frame, a window frame, or a furniture molding, as shown in FIG. 1, comprises an elongated wooden strip body 10 having a predetermined length and stylish cross section. The strip body 10 has a rear surface 11 for attaching to the wall by means of nailing or gluing and a waved front surface 12 for decorating purpose.

Normally, a layer of paint must be provided on all exposed longitudinal surfaces of the strip body 10 so as to protect the wooden strip body 10 from moisture and to match the color painting of the wall or ceiling where the strip body 10 is affixed thereon. In view of such painting layer, the conventional wooden construction strip bears a plurality of unsolved shortcomings as follows:

(1) The painting process of the wooden construction strip is very troublesome and costly. The worker has to paint each construction strip manually before affixing to the wall. A lot of work and time must be involved that relatively increases the construction cost. Some construction strip manufacturers provide painted construction strips in market in order to lessen the labor of the constructors. The most efficient way for mass production of painted construction strip in factory is to spray paint on the wooden strip body by a painting machine. The painting machine generally comprises at least a spray gun which is driven to move up and down repeatedly and a feeding device for transmitting mass number of wooden strip bodies vertically towards the spray gun. While each strip body is passing by the spray gun, the strip body is driven to rotate and the spray gun is activated to move up and down and spray painting onto the rotating strip body, so that a layer of paint is applied on all longitudinal surfaces of the strip body.

How to apply painting evenly on all longitudinal surfaces of the strip body is one of the major problems of the spraying method of every strip body manufacturer. High efficiency and expensive painting machine is suggested to use in factory in order to produce strip bodies with better painting quality. Moreover, no matter what kind of painting machine is used, large amount of costly painting will be sprayed to the air during the spraying process, that causes unavoidable waste and pollution. Many chemicals in paint are harmfull to human body. In other words, all workers are exposed in a hazardous environment, therefore how to collect those waste painting becomes another big problem to the manufacturer.

(2) The painting layer on the wooden strip body has poor resistance against scratching. During transportation and constructing procedure, there is a great chance to cause scratch on the exterior painting layer of the construction strip and that, due to the soft nature of the wooden strip body, the strip body also has a big risk of being damaged by scratching or accidentally impacting.

(3) The edge portion of the painting layer of the construction strip will easily be peeled off when the construction strip is cut to desired size and shape.

(4) If plastic or metal made tubes or strips are used, it is more difficult to provide a durable painting layer thereon.

(5) The contour design of the construction strip must be limited to avoid any sharp indention or concave edge because it is very difficult to evenly apply or spray paint on such area.

SUMMARY OF THE PRESENT INVENTION

It is thus a first object of the present invention to provide a construction strip which integrally provides a colorful protective coating shell thereon, wherein the protective coating shell has good resistance against scratching and peeling off.

A further object of the present invention is to provide a construction strip having a colorful protective coating shell integrally coated outside, wherein the protective coating shell is a waterproof hard shell wrapped around the interior strip body so as to shelter the strip body from moisture. Moreover, the user may wash the construction strip periodically.

Yet another object of the present invention is to provide a construction strip having a colorful protective coating shell integrally coated thereon, which is more durable and cheaper in cost in comparison with the conventional painted wooden construction strip.

Yet another object of the present invention is to provide a construction strip having a colorful protective coating shell integrally coated thereon, wherein the protective coating shell can be evenly coated on any indention or sharp edge formed on the strip body.

Still another object of the present invention is to provide a manufacturing process of a construction strip having a colorfull protecting coating shell, which is more efficiency that can reduce the manufacturing cost and steps. Moreover, no paint will be waste and no air pollution will be caused during the manufacturing process.

In order to accomplish the above objects, the present invention provides a construction strip comprising an elongated strip body and a colorful protective coating shell, wherein the elongated strip body can be in form of strip, rod, tube or elongated board that has a uniform cross-sectional shape and a predetermined length. The strip body can be made of any constructive material such as wood, plastic or metal.

The protective coating shell which has a uniform thickness is integrally coated on the longitudinal exterior surfaces of the strip body so as to form a colorful shelter layer wrapping around the strip body. The protective coating shell is made of a dried coating mixture comprising a predetermined amount of paint and talcum powder, wherein the talcum powder is the basic content for forming the rigid the protective coating shell. The paint serves as a color content of the protective coating shell that provides the desired color and the daubing ability. In other words, the paint content in the protective coating shell enables the protective coating shell being integrally and firmly attached on the longitudinal exterior surfaces of the strip body and having a desired color. The presence of the talcum powder enables the protective coating shell having the specific properties of hardness, adhesion, solidification, scratching resistance, and rigidity.

The protective coating shell is coated on the strip body by means of an extrusion mold, in which the elongated strip body is forced to pass through an extrusion passage of the extrusion mold. The extrusion passage has a sectional size slightly larger than a sectional size of the strip body, so that a surrounding clearance is formed between an interior wall of the extrusion passage of the extrusion mold and the longitudinal exterior surfaces of the strip body. A plaster form coating mixture of paint, talcum powder and volatile agent is gradually injected into the extrusion passage to fill the surrounding clearance, so that the exterior surfaces of a portion of the strip body that is passing through the extrusion passage will be evenly coated with a layer of protective coating, i.e. the plaster form coating mixture. The strip body which is coated with a layer of protective coating is then transmitted to a drying means where heat is applied to solidify the protective coating to form the hard and durable protective coating shell. The protecting coating on the strip body can also be dried naturally in air, wherein the volatile agent will gradually volatilize so that the protective coating will be solidified to form the protective coating shell. About thirty minutes will be consumed for this volatilization step.

DETAILED DESCRIPTION OF THE PREFERRED EMBODIMENT

Figure 1:
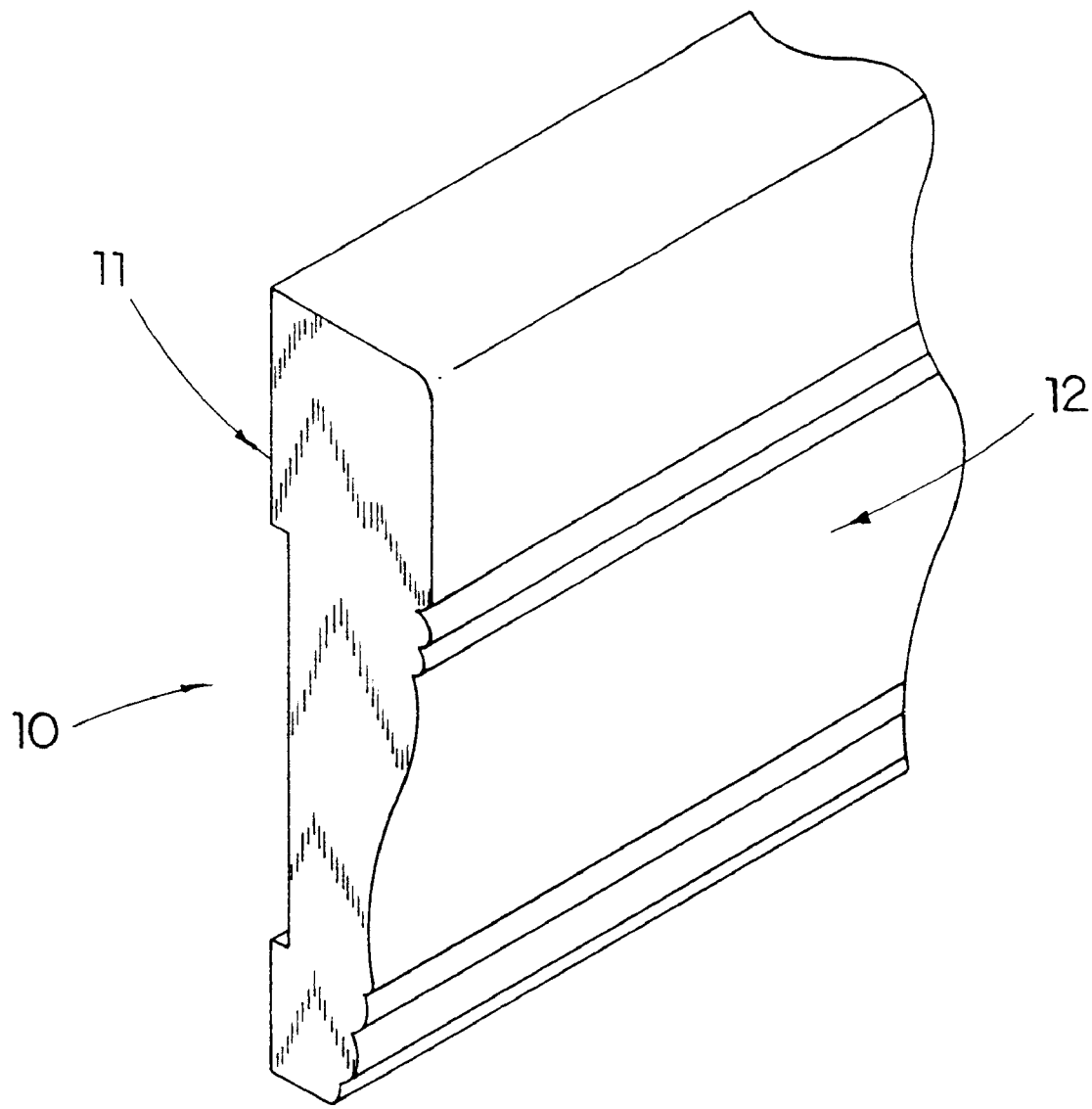
FIG. 1 is a perspective view of a conventional constructive strip.
Figure 2:
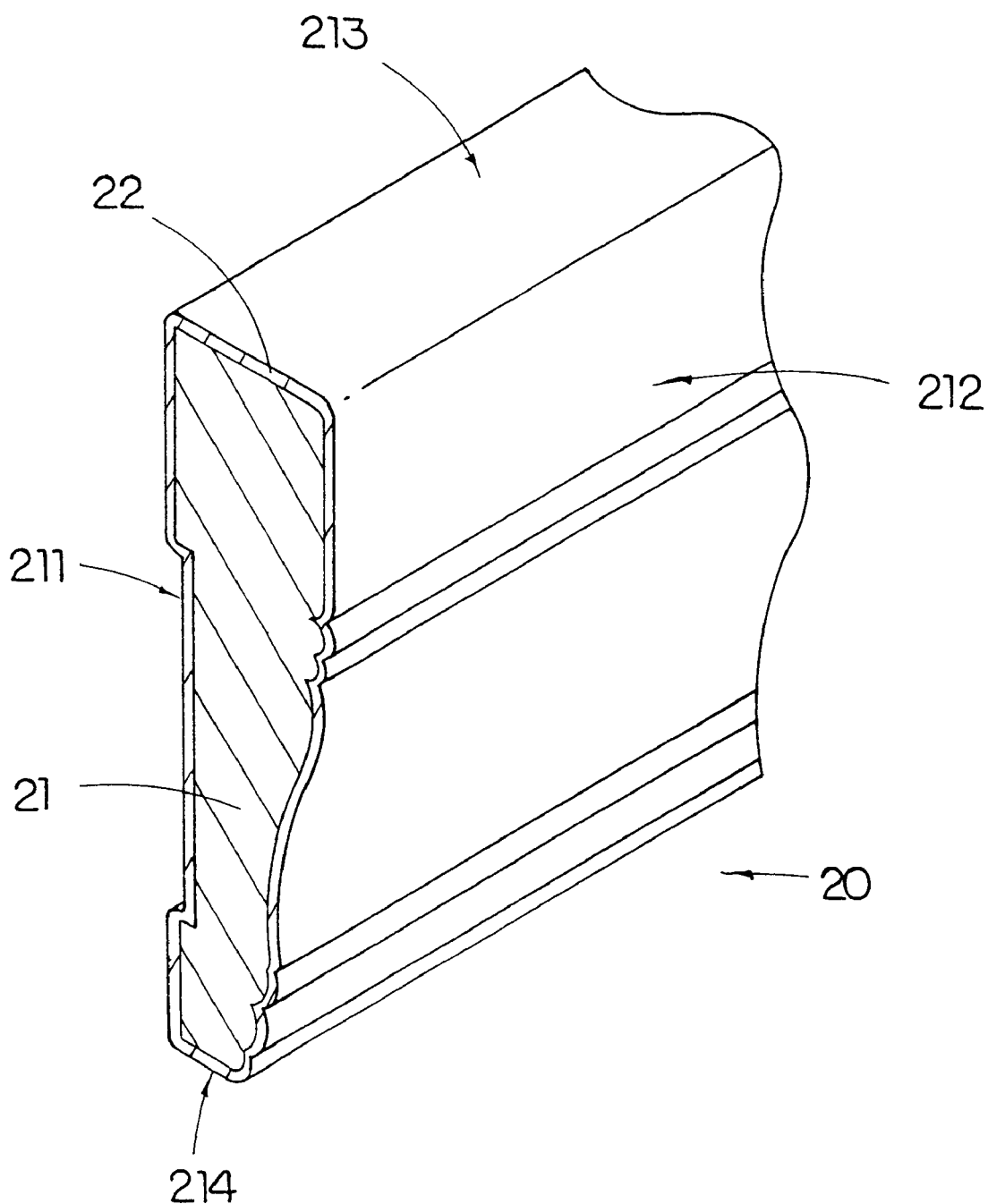
FIG. 2 is a sectional perspective view of a construction strip of a preferred embodiment in accordance with the present invention.

Referring to FIG. 2, a construction strip 20 according to a preferred embodiment of the present invention is illustrated. The construction strip 20 comprises an elongated strip body 21 and a colorful protective coating shell 22, wherein the elongated strip body 21 can also be in form of rod, tube or elongated board that has a uniform cross-sectional shape and a predetermined length. According to the present embodiment, the strip body 21 is an elongated timber strip. Practically, the strip body can also be made of any constructive material such as integrated wood chips, compressed wooden scraps, plastic or metal. The strip body 21 can be any shape having a uniform cross section shape and size. The strip body 21 has a plurality of longitudinal exterior surfaces 211 to 214, including an attaching rear surface 211, a decorating waved front surface 212, a top surface 213, and a bottom surface 214, extending along the length of the strip body 21.

The protective coating shell 22 which has a uniform thickness is integrally coated on the four longitudinal exterior surfaces 211 to 214 of the strip body 21, so as to form a colorful shelter layer wrapping around the strip body 21. In other words, the four longitudinal exterior surfaces 211 to 214 are evenly and uniformly coated with the protective coating shell 22 to form an integrated body.

The protective coating shell 22 is made of a dried coating mixture which comprises a predetermined amount of paint and talcum powder evenly mixed. The talcum powder is the basic content for forming the rigid shell body of the protective coating shell 22. The paint serves as the color content of the protective coating shell that provides the protective coating shell 22 with desired color and a daubing ability. In other words, the paint content in the protective coating shell 22 helps the protective coating shell 22 to be integrally and firmly attached on the longitudinal exterior surfaces 211 to 214 of the strip body 21. The presence of the talcum powder enables the protective coating shell 22 having the specific properties of hardness, adhesion, solidification, scratching resistance, and rigidity. The protection coating shell 22 has 10% to 40% of the paint in weight and 10% to 85% of the talcum powder in weight.

Figure 3:
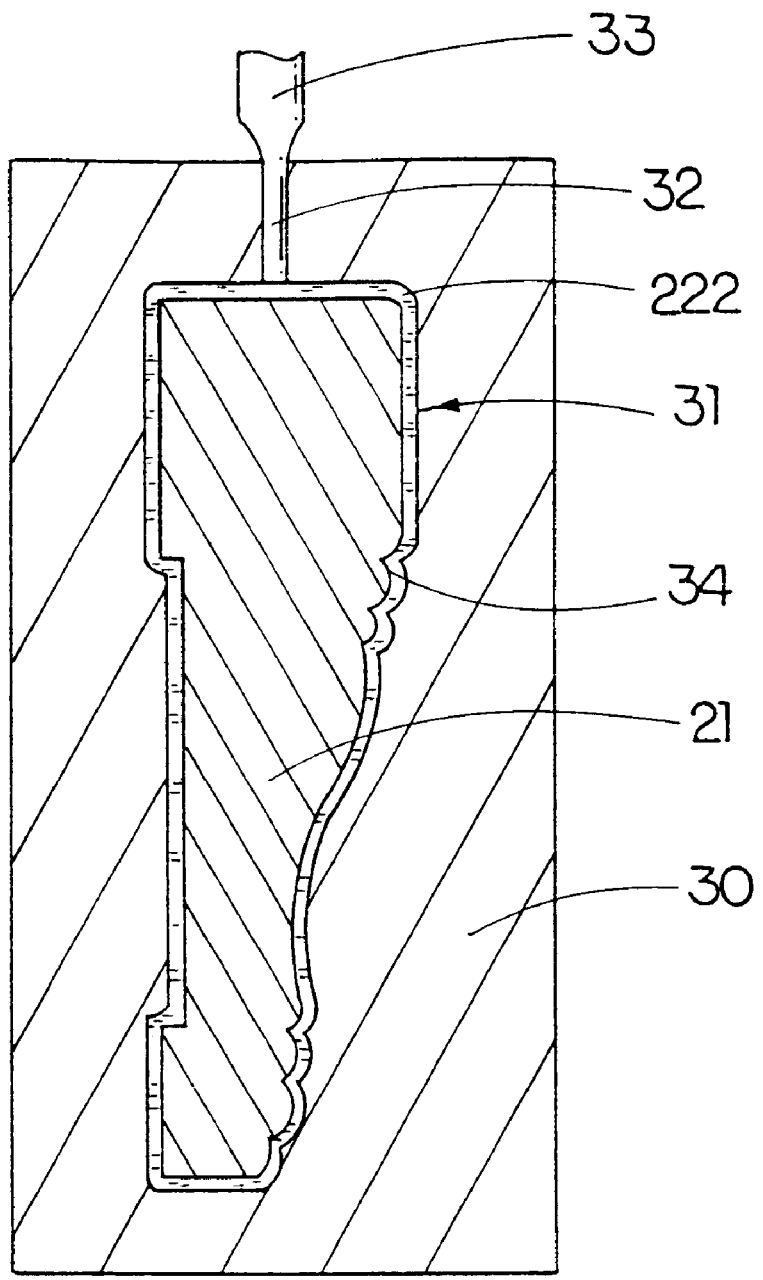
FIG. 3 is a sectional view of an extrusion mold which is equipped to coat a protective coating shell around a strip body according to a preferred embodiment of the present invention.

According to the preferred embodiment, latex is used as the paint and calsium 800M, a commercially sold trade name for talcum powder, is used as the talcum powder. As shown in FIG. 3, the protective coating shell 22 is integrally coated on the strip body 21 by means of an extrusion mold 30 which has an extrusion passage 31, which is a mold hole longitudinal passing through the extrusion mold 30, provided therethrough and an injection tunnel 32 extended from the extrusion passage 31 to an injection inlet 33. The extrusion passage 31 has a sectional size slightly larger than a sectional size of the strip body 21, so that a surrounding clearance 34 is formed between a surrounding interior wall of the extrusion passage 31 of the extrusion mold 30 and the longitudinal exterior surfaces 211 to 214 of the strip body 21.

In order to coat the protective coating shell 22 on the strip body 21, the elongated strip body 21 is forced to pass through the extrusion passage 31 of the extrusion mold 30. A tank 40 of plaster form coating mixture 221 is connected to the injection inlet 33, as shown in FIG. 4B. The plaster form coating mixture 221 comprises 10 to a 40% of paint in weight, a 10 to 85% of talcum powder in weight and a 5 to 10% of volatile agent in weight. The coating mixture 221 is gradually injected into the extrusion passage 31 through the injection tunnel 32 to fill the surrounding clearance 34, so that the exterior surfaces 211 to 214 of a portion of the strip body 21 that is passing through the extrusion passage 31 will be evenly sticked and coated with a layer of the coating mixture 221 to form a plaster form protective coating 222. According to the present embodiment, for 33 kg of the plaster form coating mixture, it comprises 6 kg of latex, 25 kg of calsium 800M, a commercially sold trade name for talcum powder, and 2 kg of polyvinyl alcohol evenly mixed, in which the polyvinyl alcohol serves as the volatile agent which renders the coating mixture 221 in plaster form. However, the volatile agent will be volatilized and renders the protective coating 222 to form the dry and rigid protective coating shell 22.

Figure 4A:
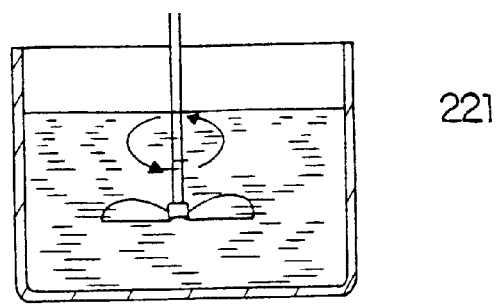
FIGS. 4A to 4C are schematic drawings illustrating a manufacturing process of a construction strip according to the present invention.
Figure 4B:
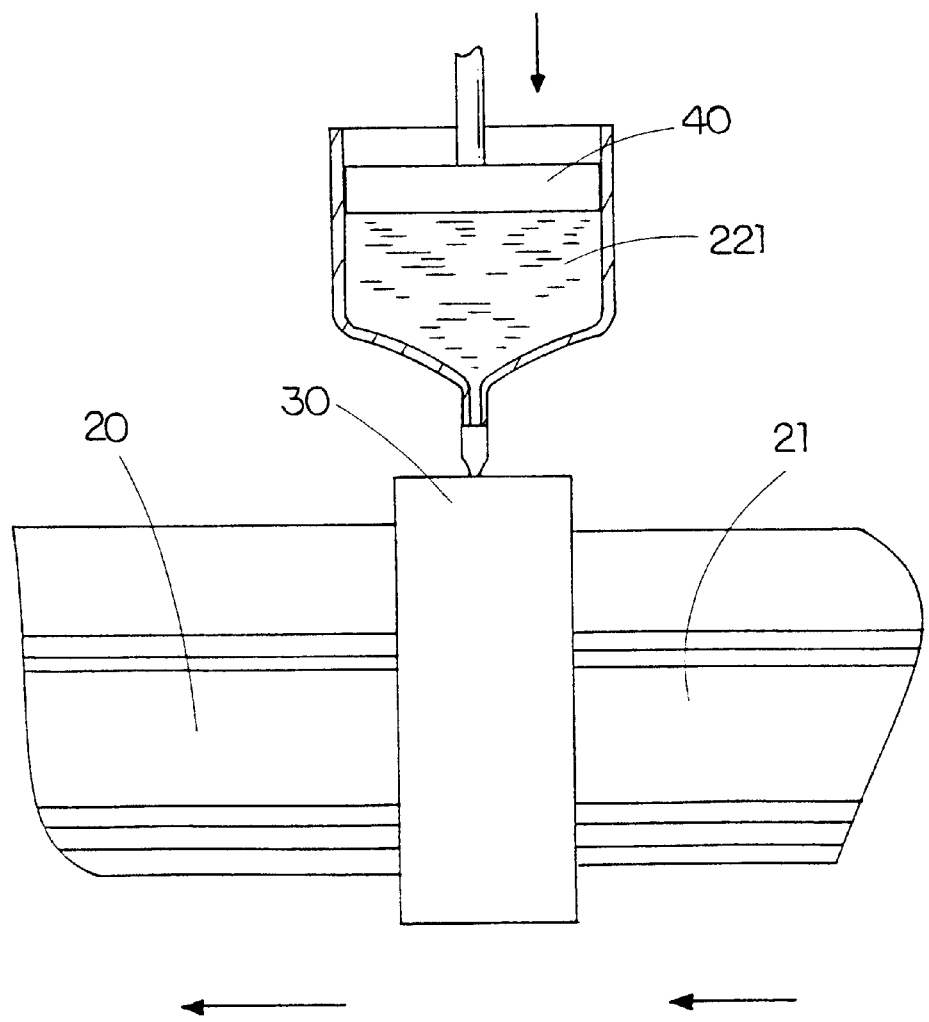
Figure 4C:
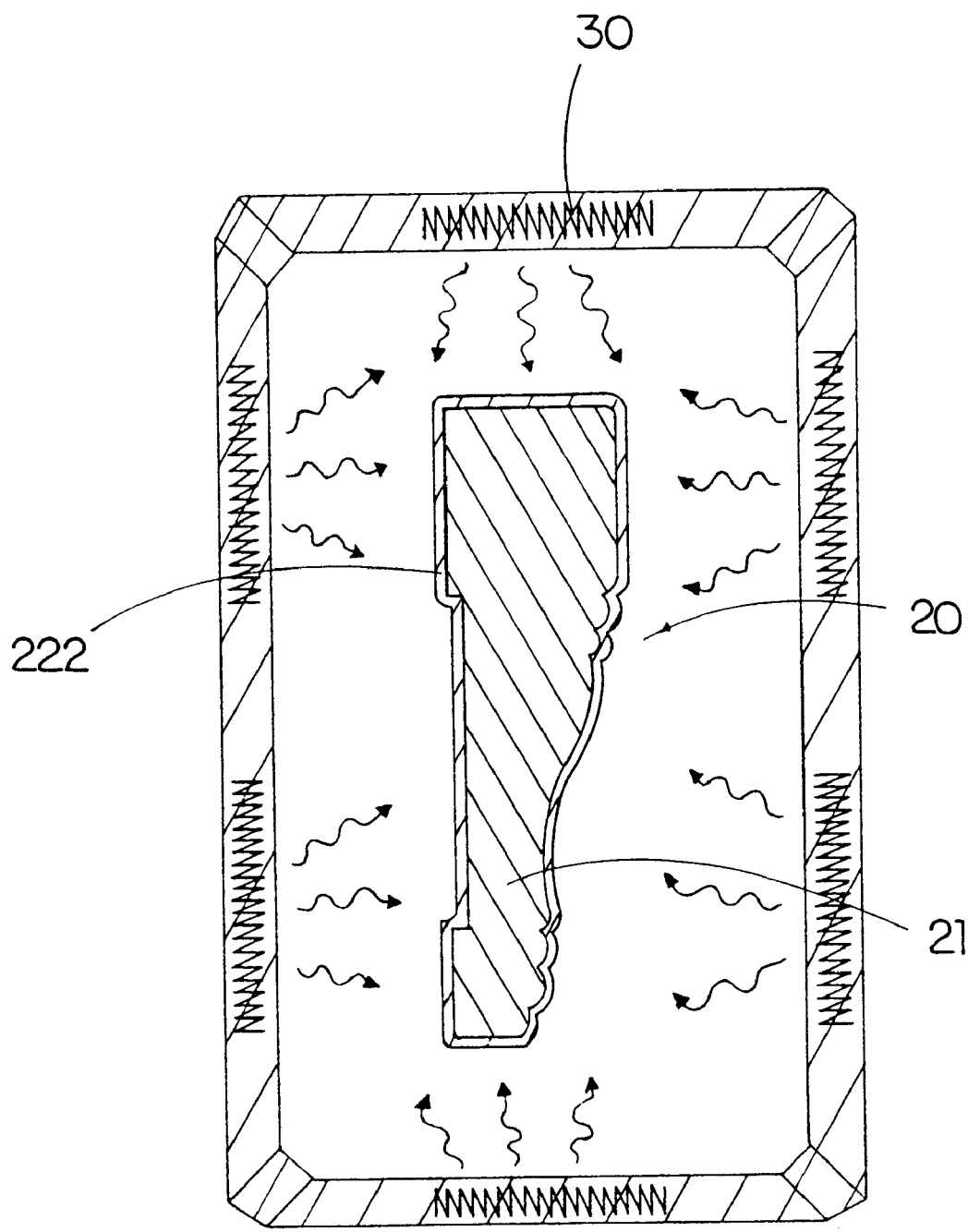

The strip body having coated with a layer of protective coating 222 is then transmitted to pass through a drying means 50 where heat is applied to facilitate the solidification of the protective coating 222 to form the hard and durable protective coating shell 22, as shown in FIG. 4C. The protecting coating 222 on the strip body 22 can also be dried naturally in air, wherein the volatile agent will gradually volatilize so that the protective coating 222 will be solidified to form the protective coating shell 22. About thirty minutes will be consumed for this volatilization step.

In stead of daubing a painting layer on the strip body, the construction strip of the present invention integrally coats a colorful protective coating shell 22 on the strip body 21 to shelter the strip body 21 from moisture. Moreover, since the protective coating shell has good resistance against scratching and peeling off, the construction strip 20 is well protected from scratching and can be cut to any size and shape without the worrisome of peeling off. The protective coating shell is a waterproof hard shell wrapped around the interior strip body, so that the user may wash the construction strip periodically. In other words, the construction strip of the present invention is more durable and cheaper in cost in comparison with the conventional painted wooden construction strip. Furthermore, since the protective coating shell 22 is coated on the strip body 21 by molding, the protective coating shell can be evenly coated on any indention or sharp edge formed on the strip body.

Referring to FIGS. 4A to 4C, a manufacturing process of the construction strip is illustrated, which comprises the following steps:

(1) Evenly mix a predetermined amount of paint, talcum powder and volatile agent to form a plaster form coating mixture 221, as shown in FIG. 4A.

(2) Gradually pass an elongated strip body 21 through an extrusion passage 31 of an extrusion mold 30, wherein a uniform surrounding clearance 34 between an interior wall of the extrusion passage 31 and the strip body 20, as shown in FIGS. 3 and 4B.

(3) Continuously inject the coating mixture 221 into the extrusion passage 31 of the extrusion mold 30 in order to fill the surrounding clearance 34, so that a uniform protective coating 222 is evenly coated on the longitudinal surfaces of the strip body 21 while the strip body 21 is extruded from the extrusion mold 30, as shown in FIGS. 3 and 4B.

(4) Dry the protective coating 222 to form a hard and durable protective coating shell 22 integrally wrapped around the strip body 21, as shown in FIGS. 2 and 4C.

In step (3), the coating mixture is collected in a tank 40 which is connected to an injection inlet 33 communicated with the extrusion passage 31 via an injection tunnel 32.

In step (4), the strip body with its protective coating 221 wrapped thereon is transmitted to pass through a heat means 50 which radially applies heat onto the protective coating 222 so as to facilitate the volatilization of the volatile agent in the protective coating 222 and dry the protective coating 222 to form the protective coating shell 22.

What is claimed is:

1. A manufacturing process of a construction strip, comprising the steps of:
   (a) evenly mixing a predetermined amount of latex paint, talcum powder and polyvinyl alcohol volatile agent to form a plaster form coating mixture;
   (b) providing an extrusion mold having an extrusion passage which is a mold hole longitudinally passing through said extrusion mold and has a sectional size slightly larger than a sectional size of an elongated strip body which has a plurality of longitudinal coating surfaces surrounding said strip body;
   (c) gradually passing said elongated strip body through said mold hole of said extrusion mold and defining a uniform surrounding clearance between a surrounding interior wall of said mold hole and said longitudinal coating surfaces of said strip body;
   (d) continuously injecting said coating mixture into said mold hole of said extrusion mold in order to fill said uniform surrounding clearance until a uniform protective coating is formed around said strip body by coating on all of said longitudinal coating surfaces of said strip body while said strip body is extruded from said mold hole of said extrusion mold; and
   (e) drying said surrounding protective coating to form a hard and durable protective coating shell integrally wrapped around said strip body;
   wherein said latex paint constitutes between 10 and 40 percent of said coating mixture, said talcum powder constitutes between 10 to 85 percent of said coating mixture, and said polyvinyl alcohol volatile agent constitutes between 5 to 10 percent of said coating mixture.

2. A manufacturing process of a construction strip as recited in claim 1 wherein said latex paint constitutes 6/33 of said coating mixture, said talcum powder constitutes 25/33 of said coating mixture and said polyvinyl alcohol volatile agent constitutes 2/33 of said coating mixture.

3. A manufacturing process of a construction strip, comprising the steps of:
   (a) evenly mixing a predetermined amount of latex paint, talcum powder and polyvinyl alcohol volatile agent to form a plaster form coating mixture;
   (b) providing an extrusion mold having an extrusion passage which is a mold hole longitudinally passing through said extrusion mold and has a sectional size slightly larger than a sectional size of an elongated strip body which has a plurality of longitudinal coating surfaces surrounding said strip body;
   (c) gradually passing said elongated strip body through said mold hole of said extrusion mold and defining a uniform surrounding clearance between a surrounding interior wall of said mold hole and said longitudinal coating surfaces of said strip body;
   (d) continuously injecting said coating mixture into said mold hole of said extrusion mold in order to fill said uniform surrounding clearance until a uniform protective coating is formed around said strip body by coating on all of said longitudinal coating surfaces of said strip body while said strip body is extruded from said mold hole of said extrusion mold, wherein said coating mixture is collected in a tank which is connected to an injection inlet communicated with said mold hole via an injection tunnel; and
   (e) drying said surrounding protective coating to form a hard and durable protective coating shell integrally wrapped around said strip body, wherein said strip body with said protective coating wrapped thereon is transmitted to pass through a heat means which radially applies heat onto said protective coating so as to facilitate a volatilization of said volatile agent in said protective coating and dry said protective coating to form said protective coating shell;
   wherein said latex paint constitutes between 10 to 40 percent of said coating mixture, said talcum powder constitutes between 10 to 85 percent of said coating mixture, and said polyvinyl alcohol volatile agent constitutes between 5 to 10 percent of said coating mixture.

4. A manufacturing process of a construction strip as recited in claim 3 wherein said latex paint constitutes 6/33 of said coating mixture, said talcum powder constitutes 25/33 of said coating mixture and said polyvinyl alcohol volatile agent constitutes 2/33 of said coating mixture.

* * * * *